(12) United States Patent
Liu et al.

(10) Patent No.: US 7,311,001 B2
(45) Date of Patent: Dec. 25, 2007

(54) MULTIPHASE FLOW MEASUREMENT APPARATUS AND METHOD

(76) Inventors: Herbert Liu, 1675 Nutcracker Ct., Thousand Oaks, CA (US) 91320; Ke Tien Liu, 1675 Nutcracker Ct., Thousand Oaks, CA (US) 91320

( * ) Notice: Subject to any disclaimer, the term of this patent is extended or adjusted under 35 U.S.C. 154(b) by 0 days.

(21) Appl. No.: 11/713,165

(22) Filed: Mar. 1, 2007

(65) Prior Publication Data
US 2007/0204750 A1 Sep. 6, 2007

Related U.S. Application Data

(60) Provisional application No. 60/778,698, filed on Mar. 2, 2006.

(51) Int. Cl.
*G01F 1/20* (2006.01)
(52) U.S. Cl. .................... 73/215; 73/861.04
(58) Field of Classification Search ............ 73/861.04, 73/215, 61.45, 29.01, 61.44, 204.25, 200
See application file for complete search history.

(56) References Cited

U.S. PATENT DOCUMENTS

| | | | |
|---|---|---|---|
| 2,882,995 A | 4/1959 | Smith | |
| 4,429,581 A | 2/1984 | Furmaga | |
| 4,596,136 A | 6/1986 | Zacharias | |
| 4,688,418 A | 8/1987 | Cheung et al. | |
| 4,760,742 A | 8/1988 | Hatton | |
| 4,773,257 A | 9/1988 | Aslesen et al. | |
| 4,852,395 A | 8/1989 | Kolpak | |
| 4,881,412 A | 11/1989 | Northedge | |
| 4,939,817 A * | 7/1990 | Weber | 23/308 S |
| 5,099,697 A | 3/1992 | Agar | |
| 5,132,011 A * | 7/1992 | Ferris | 96/184 |
| 5,195,380 A | 3/1993 | Hatton et al. | |
| 5,390,547 A | 2/1995 | Liu | |
| 5,526,684 A | 6/1996 | Liu et al. | |
| 6,032,539 A | 3/2000 | Liu et al. | |
| 6,234,030 B1 | 5/2001 | Butler | |
| 2007/0186770 A1 * | 8/2007 | Heath et al. | 95/179 |

* cited by examiner

*Primary Examiner*—Jewel Thompson
(74) *Attorney, Agent, or Firm*—James M. Duncan; Klein, DeNatale, Goldner

(57) ABSTRACT

An apparatus is utilized for obtaining flow measurements from an individual oil and gas well. The apparatus utilizes pipe segments rather than vessels to separate the fluid components into a gas phase, a water phase, and an oil phase. Separation of the flow stream into the different phases allows the measurement of a particular phase. Because the oil stream may continue to contain a small amount of water, a water cut meter may be employed to determine the water content in the oil stream. The apparatus may be configured as a skid package to facilitate transportation and installation of the unit.

20 Claims, 3 Drawing Sheets

MULTIPHASE FLOW MEASUREMENT APPARATUS AND METHOD

CROSS-REFERENCE TO RELATED APPLICATIONS

U.S. Provisional Application No. 60/778,698 for this invention was filed on Mar. 2, 2006 for which these inventors claim domestic priority.

BACKGROUND OF THE INVENTION

The present invention generally relates to devices and methods for flow measurement. In particular, a method for continuous multiphase flow measurement is disclosed, as well as the apparatus utilized in the method. In this invention, phase separation and measurement are accomplished utilizing a compact piping arrangement as compared to the measurement vessels utilized in conventional measurement systems.

Industry utilizes or has proposed several methods to measure the production of individual oil wells. The conventional approach is to use a three-phase or two-phase separator to separate the multi-phase fluid mixture into distinctive phases. In the case where a three-phase separator is employed, three separate outgoing streams are produced. These streams comprise gas, water, and oil (which may include water or comprise an oil/water emulsion). Separate flow meters measure the respective flow rates of the outgoing streams of oil, water, and gas. An on-line "cut" meter may be utilized to determine the water content of the oil stream. The two-phase separator operates similarly to the three-phase separator except that the free water stream is omitted.

These test separators are relatively large in physical size, expensive to construct, and require an abundance of ancillary pressure control and flow regulating equipment. Accordingly, it is rarely practical to utilize this approach for production testing an individual oil well. Instead, the practice is to utilize a single test separator to production test a group of wells. Each individual well is production tested for a relatively short period of time, and its production is determined. After the well is removed from test, it is assumed that the production from the well does not vary substantially until the well is again placed on test. Depending upon the number of wells serviced by the test separator, individual wells may be tested for a relatively short duration on a limited basis. This characteristic of multiple-well test systems may result in questionable well test results, and delay the detection of a problem with a particular well.

U.S. Pat. No. 5,390,547 (Liu) teaches a multiphase flow measurement method and apparatus using a piping arrangement which may be utilized for testing an individual well. Liu describes a technique for measuring flow rates for a multiphase fluid flow for continuously and respectively measuring the quantities of one gas and one or two liquid components flowing concurrently in a common pipeline. In Liu, the mixture delivered by a feed pipeline is separated into two separate streams of gas and liquid by a piping configuration, as opposed to conventional separators. The system then measures the flow rate in each stream individually. If there are multiple liquid components in the liquid phase, an on-line liquid fraction meter determines the proportion of each liquid component. The piping system then combines the two flow streams to a common discharge pipeline. Thus, Liu provides a technique to determine respective flow rates in a multiphase fluid flow system that is continuous and accurate using an apparatus, which is compact, low cost, reliable, and requires little maintenance. This technique has been effective in the measurement of oil and gas from individual wells.

The invention disclosed by Liu utilizes a two phase measurement technique, in that the incoming multiphase flow stream (i.e., natural gas, crude oil, and produced water) are separated into two separate streams, namely a gas phase and a liquid phase. The gas phase predominantly comprises natural gas. The liquid phase predominantly comprises a mixture of crude oil and produced water, but no further separation of the liquid phase occurs. Instead, a "water cut meter" is used to determine the water content in the liquid stream. The respective volumes of net oil and produced water are ascertained by applying the water cut measurement to the total liquid flow rate.

However, as the water cut in the liquid stream increases, the net oil measurement loses accuracy because the net oil measurement resolution sharply decreases when the water cut of the production stream increases. An increase in water cut is common for mature, depleting water drive hydrocarbon reservoirs.

SUMMARY OF THE INVENTION

The presently disclosed apparatus provides an apparatus for separating and measuring the components of a multiple component fluid stream, specifically where the fluid stream comprises oil, gas, water, and related constituents. For purposes of this specification, and the claims to follow, the terms "oil phase" and "oil stream" are collectively defined to include the following compositions: (1) oil containing a small percentage of water (generally ten percent or less); and/or (2) oil/water emulsions.

The disclosed compact apparatus separates the liquid stream into a water stream and an oil stream, such that the flow rates of the water stream and oil stream may be measured separately. Because the oil stream may continue to contain a small amount of water, a conventional water cut meter may be employed to determine the water content in the oil stream.

The disclosed apparatus does not require the vessels or tanks generally utilized for separation of the fluid components as generally utilized. Instead, the separation of the fluid components occurs in piping segments. These piping segments, referred to herein as "separators" because of the component separation which occurs therein, are fabricated from pipe. A first piping segment is configured into a vertical separator for separating the free gas phase from the liquid phase. The free gas flows into a gas line at the upper portion of the vertical separator. The gas phase is thereafter measured and subsequently discharged back into the production flow line.

The liquid phase is discharged from the lower portion of the vertical separator into a liquid line, which comprises a plurality of piping segments, including a generally horizontal section, a first generally vertical chamber, and a second generally vertical chamber respectively arranged in series. The first vertical chamber, referred to as the water chamber, primarily collects and discharges a water phase through a first actuated control valve into a discharge line. The second vertical chamber, referred to as the oil chamber, primarily collects and discharges an oil phase through a second actuated control valve into the discharge line. A weir plate divides the water chamber and the oil chamber. An interface detection device is disposed adjacent to the water chamber, upstream of the weir plate. The oil chamber comprises a high liquid level switch and a low liquid level switch. The discharge line comprises flow measurement means.

The first actuated control valve is normally open. When the level of the oil phase reaches the high liquid level switch, the first actuated control valve on the water chamber closes and the second actuated control valve on the oil chamber opens. When the level of the oil phase reaches the low liquid level switch, the second actuated control valve on the oil chamber closes and the first actuated control valve opens.

DETAILED DESCRIPTION OF THE EMBODIMENTS

Figure 1:
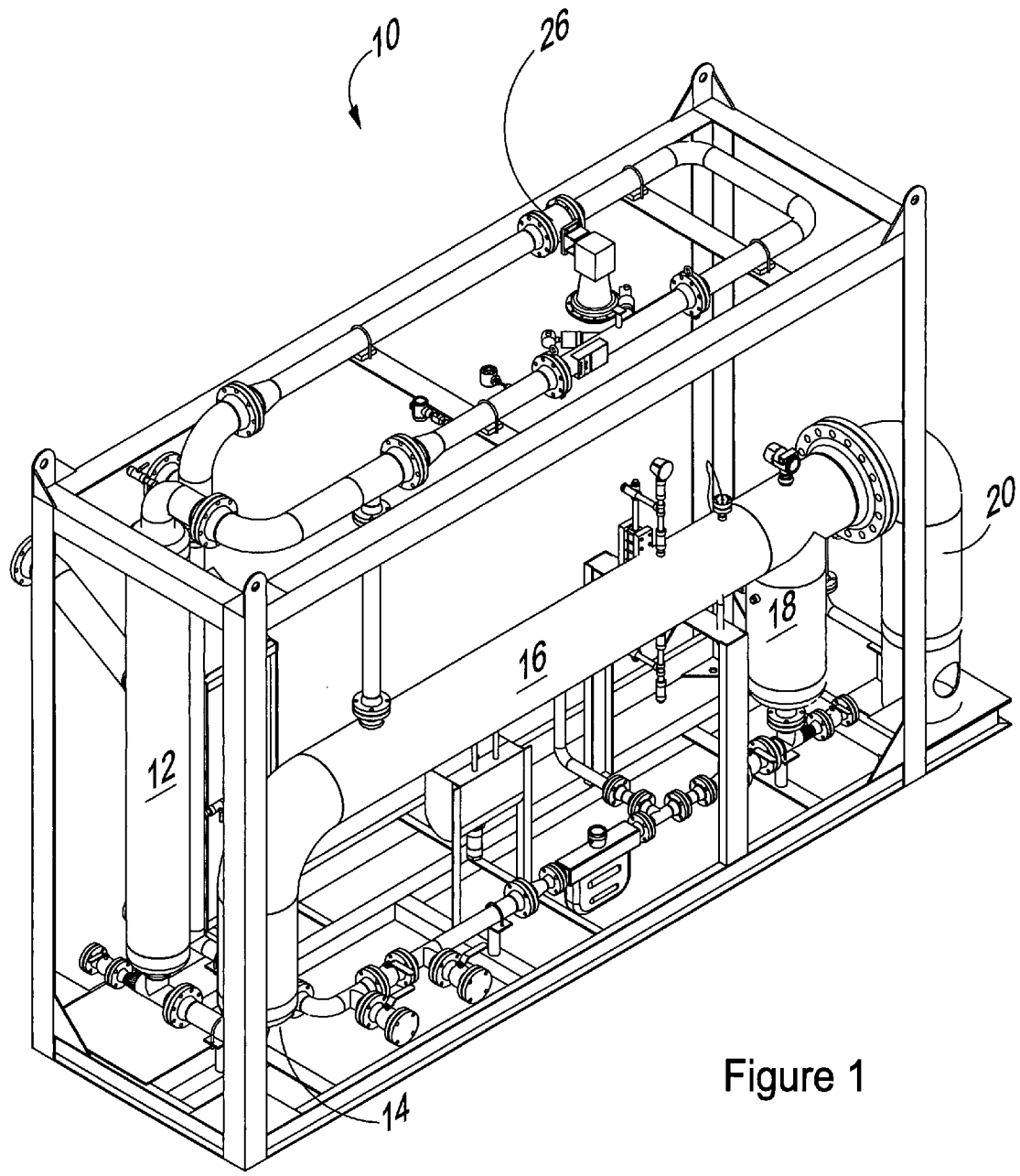
FIG. 1 shows a perspective front view of an embodiment of the disclosed apparatus.

Referring now specifically to the drawings, FIG. 1 shows an embodiment 10 of the disclosed multiphase measurement apparatus which has been configured into a skid package. The skid configuration facilitates transporting and installing the apparatus for production testing an individual well.

This embodiment 10 generally includes a plurality of "separators" which have been fabricated from segments of commercial grade pipe and fittings suitable for oil and gas service, including suitability for corrosive service if required by the particular application. These separators comprise a vertical separator 12 and a liquid line 14 which comprises a generally horizontal section 16, a first generally vertical chamber, referred to hereafter as the water chamber 18, and a second generally vertical chamber, referred to hereafter as the oil chamber 20. While various pipe sizes might be employed for fabrication of the different components of the invention, it has been found that vertical separator 12 is preferably fabricated from pipe having a diameter ranging from six inches to thirty-six inches, but may be sized as large as forty-eight inches. The components of liquid line 14 are similarly fabricated from pipe. Horizontal section 16 is preferably fabricated from pipe having a diameter of six inches to thirty-six inches, but may be sized as large as forty-eight inches. Water chamber 18 and oil chamber 20 may be fabricated from pipe having a diameter of six inches to forty-eight inches, but will preferably have the same diameters as horizontal section 16. It is to be appreciated that the diameters of the various components of vertical separator 12 and liquid line 14 may comprise a variety of combinations, which will depend on the desired flow rates and the chemical and physical properties of the various fluid phases.

The production line from the well to be tested is connected to inlet pipe 22 of vertical separator 12. As described in greater detail in U.S. Pat. No. 5,526,684, inlet pipe 22 may be mounted downwardly and tangentially connected between the top end and bottom end of vertical separator 12 to initiate a vortex separation mechanism of the fluid entering the vertical separator. Free gas in the vertical separator 12 flows into a gas line 24 at the upper portion of the vertical separator. Backpressure on vertical separator 12 may be maintained by actuated control valve 26, which may be actuated by pneumatic, electrical, or hydraulic means known in the art. Controlling the actuation of the actuated control valve 26 may be implemented by processing means, such as a programmable controller, computer, or work station. The gas phase may be measured by gas flow meter 102 and subsequently commingled with liquids discharged from the water chamber 18 and the oil chamber 20 into the outlet piping 28 of the apparatus 10. Gas flow meter 102 may be an orifice meter, turbine meter, vortex shedding meter, ultrasonic meter or other comparable device, depending upon the specific service requirements. A differential pressure transmitter 105 may provide a signal to the processing means.

The liquid phase of the vertical separator 12, comprising an oil phase and a water phase, is discharged from the lower portion of the separator into liquid line 14. As discussed above, the term "oil phase" is defined to include oil containing a small percentage of water or an oil/water emulsion. Liquid line 14 comprises a plurality of piping segments, which include, in respective serial placement, a generally horizontal section 16, the water chamber 18 and the oil chamber 20. Liquid line 14 further comprises a vent line 25 which allows the flow of gas from the liquid line to the gas line 24.

Depending upon the fluid properties, flow rate and the diameter of generally horizontal section 16, gravity separation of the oil phase and water phase will take place to some degree within the generally horizontal section 16, such that upon reaching water chamber 18, there will some degree of phase separation between the oil phase and water phase. Because the oil phase will typically have a lower density than the water phase, the oil phase will normally rise to the upper portion of the horizontal section 16 and the water phase will flow to the lower portion of the horizontal section. However, it is to be appreciated that some crude oils have densities higher than that of water, in which case the relative elevational positions of the oil phase and water phase as described herein would be reversed. A level indicating device, such as level gauge 107 may be utilized to provide the fluid level within horizontal section 16.

Water chamber 18 discharges the water phase through an actuated control valve 30. The water phase may be measured by a liquid flow meter 104. Acceptable liquid flow meters include coriolis, turbine meter, or positive displacement meters. The water phase is routed to the outlet piping 28 of the apparatus 10, where the water phase is commingled with the gas phase from vertical separator 12 and discharged from the apparatus.

Figure 3:
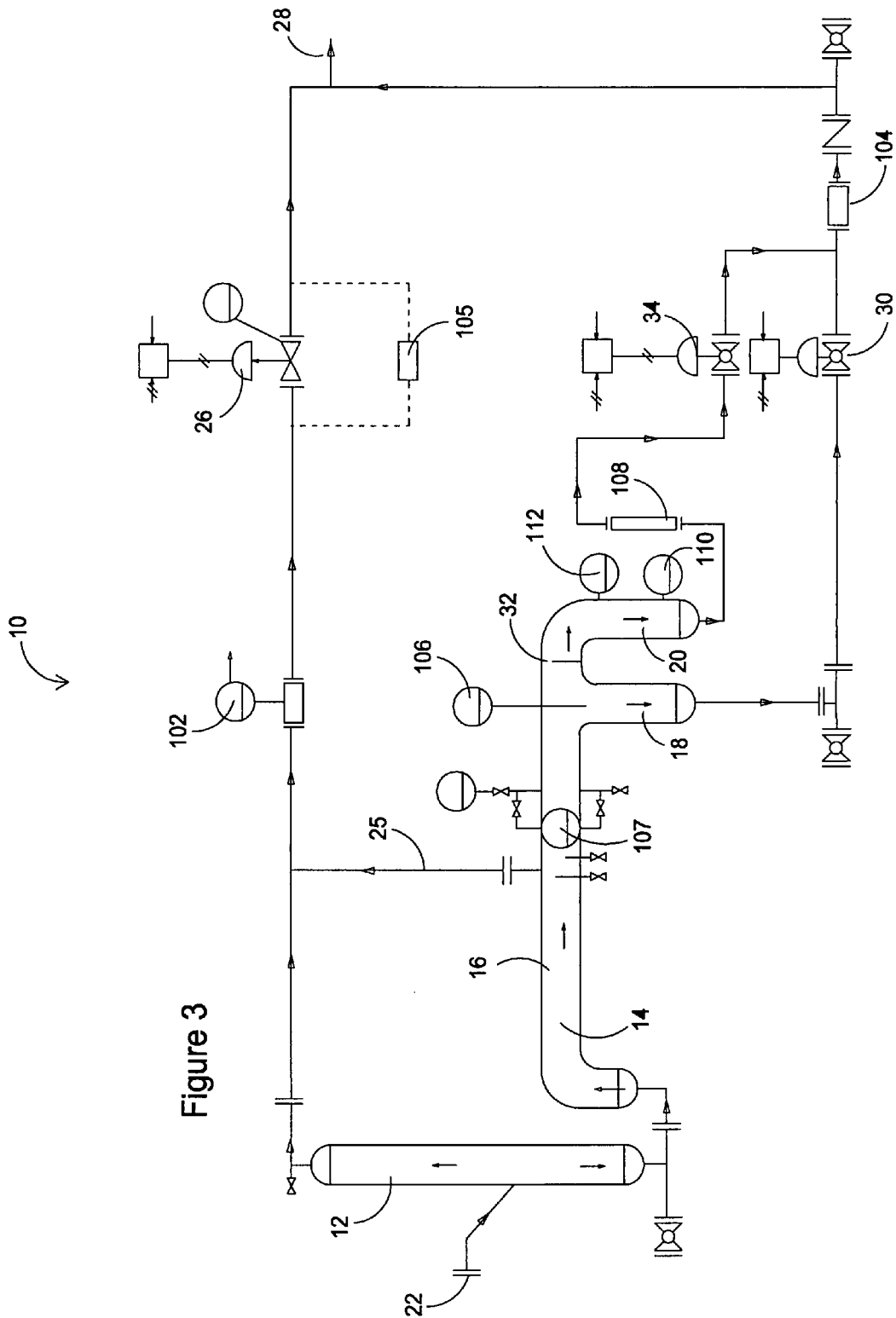
FIG. 3 is a simplified diagram of an embodiment of the disclosed apparatus.

As shown in FIG. 3, a weir plate 32 is installed in the liquid line 14 between the water chamber 18 and the oil chamber 20. An interface detection device 106 has a probe installed in the piping above or adjacent to water chamber 18, upstream of weir plate 32. The interface detection device 106 typically uses relative capacitance measurements or guided wave radar to detect the level of the interface between the heavier liquid component, typically the water phase, and the lighter liquid component, typically the oil phase. The interface detection device 106 includes a transmitter which transmits a signal to processing means, such as a programmable controller. The oil chamber 20 collects the oil phase which flows over weir plate 32. Oil chamber 18 discharges the oil phase through an actuated control valve 34. The oil phase may be measured by liquid flow meter 104. Because the oil phase will likely include a small percentage of water, the apparatus may comprise means for ascertaining the amount of water in the oil phase, such as a water cut meter 108. Suitable water cut meters may be of the capacitance-type, such as those manufactured by Hydril, Drexelbrook, Halliburton, MSIP, Robertshaw, etc. Alternatively, microwave-type water cut meters may be utilized, such as those manufactured by Phase Dynamics, Agar, Roxar, etc.

Other types of water cut meter 108 may also be employed, such as those which are based upon radio frequency energy absorption and density differential principles.

As shown in FIG. 3, oil chamber 20 comprises a low fluid level detection device 110 and a high fluid level detection device 112 which are disposed in a vertically stacked arrangement The low level detection device 110 and high fluid level detection device 112, typically configured as switches, transmit a signal which causes the actuation of actuated control valve 30 (referred to herein as the "first actuated control valve") and actuated control valve 34 (the "second actuated control valve"). The first actuated control valve 30 is normally open. When the level of the oil phase reaches the high fluid level detection device 112, the first actuated control valve 30 on the water chamber closes and the second actuated control valve 34 opens. When the level of the oil phase reaches the low level detection device, the second actuated control valve 34 closes and the first actuated control valve 30 opens. The first actuated control valve 30 and the second actuated control valve 34 may be operated by processing means based upon input provided by, among other possible devices, the interface detection device 106, the low level detection device 110 and the high fluid level detection device 112. The interaction of these devices may be utilized to maintain the oil phase/water phase interface at some distance below the top of the weir plate 32, but above the bottom of the generally horizontal section 16, allowing the oil phase to spill over the weir plate and accumulate in the oil chamber 20.

As shown in the figures, the apparatus may include a variety of additional piping, fittings and valves, as well as having additional instrumentation and controls.

Figure 2:
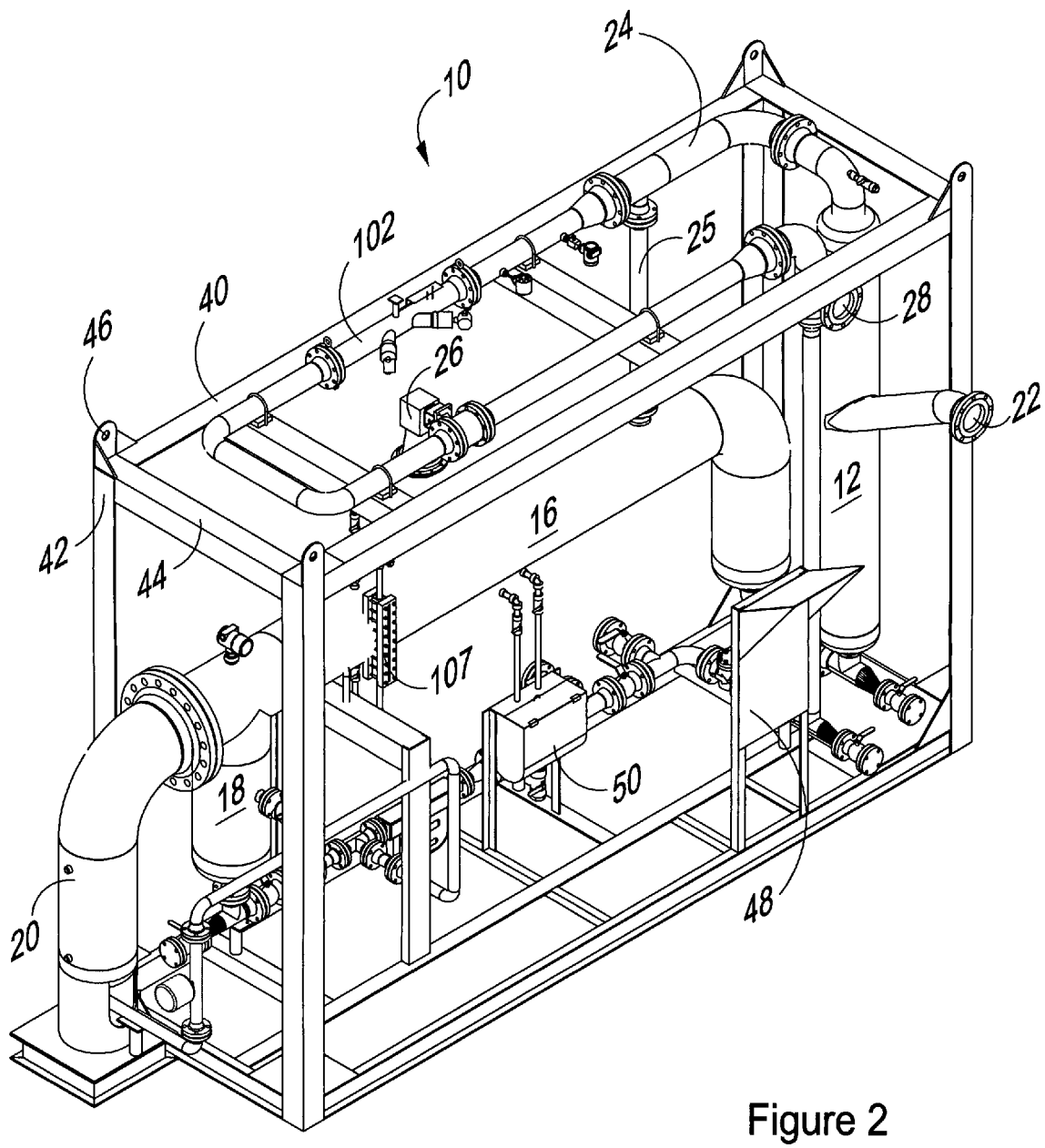
FIG. 2 shows a perspective rear view of the embodiment of the apparatus shown in FIG. 1.

As shown in FIG. 1 and FIG. 2, the apparatus may be assembled as a self-contained skid unit to facilitate transportation and installation of the invention. As indicated in the figures, the skid may be configured with various structural steel members, including longitudinal beams 40, vertical beams 42, and transverse beams 44 to provide sufficient strength for the skid to be placed by crane lifting, which is facilitated by eye plates 46. As also shown in the figures, the beam members provide convenient anchors for the various piping components. The self-contained skid may also include all controls and displays required by the unit, including a display panel 48 and programmable controller 50. The flanged fittings are provided within the self-contained skid to facilitate connecting the unit between an oil well and the existing production facilities.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. An apparatus for separating and measuring fluid streams comprising an oil phase, a water phase, and a gas phase, the apparatus comprising:
    a generally vertical fluid separator pipe having a top end and a bottom end, an inlet member connected to the vertical fluid separator pipe between the top end and the bottom end, the vertical fluid separator pipe further comprising a first outlet at the top end, the first outlet generally for discharge of the gas phase, and a second outlet at the bottom end, the second outlet generally for discharge of the oil phase and water phase;
    a first conduit connected to the first outlet, the first conduit comprising backpressure control means and gas flow measurement means;
    a second conduit connected to the second outlet, the second conduit comprising a generally horizontal section, a first vertical chamber, and a second vertical chamber arranged in series;
    a weir plate dividing the first vertical chamber and the second vertical chamber;
    an interface detection device disposed adjacent to the first vertical chamber, upstream of the weir plate;
    the second vertical chamber comprising a low fluid level detection device and a high fluid level detection device in vertically stacked arrangement, the low fluid level detection device below the high fluid level detection device;
    a first actuated valve connected to the first vertical chamber;
    a second actuated valve connected to the second vertical chamber;
    a discharge line connected to the first actuated valve and to the second actuated valve, the discharge line comprising liquid flow measurement means; and
    processing means operationally connected to the interface detection device, to the low fluid level detection device, to the high fluid level detection device, the first actuated valve and the second actuated valve, the processing means configured to operate the first actuated valve and second actuated valve such that the level of the interface between the oil phase and water phase is maintained below the top of the weir plate and the oil phase flows into the second vertical chamber.

2. The apparatus of claim 1 wherein the discharge line further comprises means for determining the amount of water contained within the oil phase.

3. The apparatus of claim 1 wherein the diameter of the vertical separator pipe has a range from 6 inches to 36 inches.

4. The apparatus of claim 1 wherein the diameter of the generally horizontal section has a range from 6 inches to 36 inches.

5. The apparatus of claim 1 wherein the diameters of the first vertical chambers and the second vertical chambers have the same diameter as the generally horizontal section.

6. The apparatus of claim 1 wherein the interface detection device is a capacitance sensing device.

7. The apparatus of claim 1 wherein the interface detection device is a guided wave radar device.

8. The apparatus of claim 2 wherein the means for determining the amount of water contained within the oil phase comprises a water cut meter.

9. The apparatus of claim 7 wherein the water cut meter comprises a capacitance type device.

10. The apparatus of claim 7 wherein the water cut meter comprises a micro-wave type device.

11. The apparatus of claim 7 wherein the water cut meter comprises a radio frequency energy absorption device.

12. The apparatus of claim 1 wherein the liquid flow measurement means comprises a coriolis meter.

13. The apparatus of claim 1 wherein the liquid flow measurement means comprises a turbine meter.

14. The apparatus of claim 1 wherein the liquid flow measurement means comprises a positive displacement meter.

15. The apparatus of claim 1 wherein the gas flow measurement means comprise an orifice meter.

16. The apparatus of claim 1 wherein the gas flow measurement means comprise a vortex shedding meter.

17. The apparatus of claim 1 wherein the gas flow measurement means comprise an ultrasonic meter.

18. The apparatus of claim 1 wherein the processing means comprises a programmable controller.

19. The apparatus of claim 1 wherein the inlet member is tangentially connected between the top end and bottom end of the vertical separator.

20. The apparatus of claim 1 wherein the apparatus is configured as a self-contained skid unit.

* * * * *